US011697077B2

(12) United States Patent
Soon-Shiong

(10) Patent No.: US 11,697,077 B2
(45) Date of Patent: Jul. 11, 2023

(54) METHODS AND SYSTEMS FOR SEPARATING METALS

(71) Applicant: Nant Holdings IP, LLC, Culver City, CA (US)

(72) Inventor: Patrick Soon-Shiong, Los Angeles, CA (US)

(73) Assignee: NANT HOLDINGS IP, LLC, Culver City, CA (US)

( * ) Notice: Subject to any disclaimer, the term of this patent is extended or adjusted under 35 U.S.C. 154(b) by 0 days.

(21) Appl. No.: 17/570,986

(22) Filed: Jan. 7, 2022

(65) Prior Publication Data

US 2022/0126221 A1 Apr. 28, 2022

Related U.S. Application Data

(62) Division of application No. 17/185,338, filed on Feb. 25, 2021, now Pat. No. 11,260,315.

(60) Provisional application No. 62/985,009, filed on Mar. 4, 2020.

(51) Int. Cl.
| | |
|---|---|
| *B01D 1/00* | (2006.01) |
| *B01D 5/00* | (2006.01) |
| *F24S 23/70* | (2018.01) |
| *C22B 9/02* | (2006.01) |
| *B01D 3/00* | (2006.01) |

(52) U.S. Cl.
CPC ........... *B01D 1/0035* (2013.01); *B01D 3/009* (2013.01); *B01D 5/006* (2013.01); *B01D 5/009* (2013.01); *C22B 9/02* (2013.01); *F24S 23/70* (2018.05)

(58) Field of Classification Search
CPC ...... B01D 1/0035; B01D 3/009; B01D 5/006; B01D 5/009; F24S 23/70; C22B 9/02
See application file for complete search history.

(56) References Cited

U.S. PATENT DOCUMENTS

| | | | |
|---|---|---|---|
| 2,239,371 A | | 4/1941 | Osborn et al. |
| 2,607,675 A | * | 8/1952 | Gross ........................ C22B 5/16 75/622 |
| 6,805,833 B2 | * | 10/2004 | Tayama .................. C22B 17/06 266/905 |
| 10,418,842 B2 | | 9/2019 | Soon-Shiong |
| 2013/0234069 A1 | * | 9/2013 | Henry ..................... F24S 23/70 252/372 |
| 2014/0042010 A1 | * | 2/2014 | Lylykangas ............... C01G 1/06 203/89 |

OTHER PUBLICATIONS

Office Action from corresponding U.S. Appl. No. 17/185,338 dated Jul. 2, 2021.
Office Action from corresponding U.S. Appl. No. 17/185,338 dated Sep. 3, 2021.

* cited by examiner

*Primary Examiner* — Jonathan Miller
(74) *Attorney, Agent, or Firm* — Harness Dickey & Pierce P.L.C.

(57) ABSTRACT

Methods and systems for separating a first metal from a metal-containing feed stream are provided. The method can include applying solar energy, for example, by focusing one or more mirrors in one or more heliostats, to heat a metal-containing feed stream in a heating zone to a first temperature to produce a first vapor including the first metal. The first vapor can be condensed in a condensation zone to produce a first liquid including the first metal, and the first liquid can be collected. The system can include a separation unit include a heating zone in fluid communication with a condensation zone and a means for applying solar energy to heat a metal-containing feed stream disposed in the heating zone.

9 Claims, No Drawings

METHODS AND SYSTEMS FOR SEPARATING METALS

CROSS-REFERENCE TO RELATED APPLICATIONS

This patent application is a divisional of U.S. patent application Ser. No. 17/185,338 filed on 25 Feb. 2021, which claims the benefit of U.S. Provisional Patent Application No. 62/985,009, filed on 4 Mar. 2020. The entire disclosures of each of the above recited applications are incorporated herein by reference.

FIELD

Methods and systems are provided herein for separating metals from a metal-containing feed stream using solar energy, for example, using one or more heliostat.

BACKGROUND

The background description includes information that may be useful in understanding the systems and methods described herein. It is not an admission that any of the information provided herein is prior art, or that any publication specifically or implicitly referenced is prior art.

Metals extracted from the earth traditionally require further refining to remove impurities to arrive at high purity metals, which can be used in various industrial applications. Metals can also be present in various waste streams, such as mining waste streams and industrial waste streams. Thus, the recovery of metals from such waste streams is desirable so the recovered metals can be used in other applications. One method for separation and/or purification of metals is a distillation process. Distillation of metals involves heating a metal-containing stream to a temperature suitable to vaporize the metal to be separated followed by condensing the vaporized metal in order to recover the metal. During distillation, impurities, such as lower volatility metals, can remain in the metal-containing stream.

U.S. Pat. No. 2,239,371 reports a method and apparatus for separation of metals by distillation, particularly, separation of lead, arsenic, antimony, bismuth, and tin.

U.S. Pat. No. 2,607,675 reports a method for distillation of metals, particularly separation of non-volatile metals.

A significant amount of energy can be required to heat a metal-containing feed during distillation to vaporize a metal and more energy can be required if the metal to be separated has a higher heat of evaporation and a lower vapor pressure. The energy needed during distillation can be generated by combusting fossil fuels, for example, burning coal to produce electricity. This combustion of fossil fuels can emit a substantial amount of $CO_2$. Therefore, improved processes for distilling metals are needed which require less energy and emit less $CO_2$.

SUMMARY

This section provides a general summary of the disclosure, and is not a comprehensive disclosure of its full scope or all of its features.

The present disclosure relates to methods and systems for separating metals from a metal-containing feed stream. In various aspects, the present disclosure provides a method for separating a first metal from a metal-containing feed stream. The method includes applying solar energy to heat the metal-containing feed stream in a heating zone to a first temperature to produce a first vapor including the first metal. The method further includes condensing the first vapor in a condensation zone to produce a first liquid including the first metal and collecting the first liquid.

In various aspects, the present disclosure also provides a system for separating a first metal from a metal-containing feed stream. The system includes a separation unit including a heating zone and a condensation zone, wherein the heating zone is in fluid communication with the condensation zone. The system also includes a means for applying solar energy to heat the heating zone and a metal-containing feed stream disposed inside the separation unit.

In various aspects, the present disclosure provides a method for separating a low volatility metal from a metal-containing feed stream. The method includes applying solar energy to heat the metal-containing feed stream in the presence of a halide of a volatile metal in a heating zone to a first temperature to produce a first vapor mixture including a low volatility metal halide and the volatile metal. The method further includes converting the first vapor mixture into the low volatility metal and the halide of the volatile metal and condensing the low volatility metal to produce a first liquid including the low volatility metal. The first liquid may be collected.

Various objects, features, aspects and advantages of the present subject matter will become more apparent from the following detailed description of preferred embodiments.

DETAILED DESCRIPTION

I. Methods of Separating Metals

Methods of separating a first metal from a metal-containing feed stream are provided herein. The methods can include heating the metal-containing feed stream in a heating zone to a first temperature to produce a first vapor comprising the first metal. For example, the metal-containing feed stream can be flowed over a surface heated to a temperature, e.g., a first temperature, capable of vaporizing the first metal to produce the first vapor. In any embodiment, the metal-containing feed stream can be in a liquid state, e.g., a molten state, or a solid state, e.g., as a powder, as granule, or as briquettes. The first temperature can be determined by a person of ordinary skill in the art based on upon the composition of the metal-containing feed stream, the first metal to be separated, and the conditions for separation (e.g. pressure at which the metal-containing feed stream is heated). For example, the first temperature can be greater than or equal to a temperature at which the first metal is capable of vaporizing at a specified pressure. In some embodiments, the first temperature may be greater than or equal to the boiling point of the first metal. In some embodiments, the first temperature can be greater than or equal to about 250° C., greater than or equal to about 500° C., greater than or equal to about 750° C., greater than or equal to about 1,000° C., greater than or equal to about 1,250° C., greater than or equal to about 1,500° C., greater than or equal to about 1,750° C., greater than or equal to about 2,000° C., greater than or equal to about 2,250° C., greater than or equal to about 2,500° C., greater than or equal to about 2,750° C., greater than or equal to about 3,000° C., greater than or equal to about 3,250° C., greater than or equal to about 3,500° C., greater than or equal to about 3,750° C., or greater than or equal to about 4,000° C.; or from about 250° C. to about 4,000° C., about 750° C. to about 4,000° C., about 1000° C. to about 4,000° C., or about 2,000° C. to about 4,000° C.

In some embodiments, the metal-containing feed stream can be heated in the heating zone at a pressure below atmospheric pressure. In other words, at least a portion of the separation process may be performed under a vacuum. In such embodiments, the first temperature can be less than the boiling point of the first metal. In some embodiments, the pressure under which the metal-containing feed stream is heated can be less than or equal to about 100,000 Pa, less than or equal to about 50,000 Pa, less than or equal to about 10,000 Pa, less than or equal to about 1,000 Pa, less than or equal to about 100 Pa, less than or equal to about 20 Pa, or about 1 Pa; or from about 1 Pa to about 50,000 Pa, about 1 Pa to about 10,000 Pa, about 1 Pa to about 1,000 Pa, about 1 Pa to about 100 Pa or about 1 Pa to about 20 Pa.

The methods further include cooling or condensing the first vapor in a condensation zone to produce a first liquid comprising the first metal. For example, the first vapor can be flowed over a cooled surface, e.g., in a condenser, at a second temperature, which is capable of condensing the first metal in the first vapor to produce the first liquid. The first liquid may form on the cooled surface. The second temperature can be determined by a person of ordinary skill in the art based on upon the first metal vapor to be condensed and the conditions for condensing (e.g. pressure at which the first metal vapor is cool). For example, the second temperature can be greater than or equal to the melting point of the first metal and/or less than the boiling point of the first metal. In some embodiments, the second temperature can be less than or equal to about 4,000° C., less than or equal to about 3,750° C., less than or equal to about 3,500° C., less than or equal to about 3,250° C., less than or equal to about 3,000° C., less than or equal to about 2,750° C. less than or equal to about 2,500° C., less than or equal to about 2,250° C., less than or equal to about 2,000° C., less than or equal to about 1,750° C., less than or equal to about 1,500° C., less than or equal to about 1,250° C., less than or equal to about 1,000° C., less than or equal to about 750° C., less than or equal to about 500° C., less than or equal to about 250° C., or less than or equal to about 100° C.; or from about 100° C. to about 4,000° C., about 250° C. to about 3,000° C., about 500° C. to about 2,000° C., or about 1250° C. to about 2,000° C. The first liquid may be collected to recover the first metal. Optionally, the first liquid may be solidified via further cooling.

In any embodiment, the metal-containing feed stream can also comprise at least one further metal in addition to the first metal, e.g. a second metal, a third metal, a fourth metal, etc., as well as mixtures or alloys of metals. In some aspects, a further metal may be considered to be an impurity or it may be another metal to be recovered through the separation process. Additionally or alternatively, the metal-containing feed stream may also include non-metal impurities, for example, carbon, hydrogen, oxides, carbides, etc. In any embodiment, a second metal, a non-metal impurity or a combination thereof may not substantially vaporize at the first temperature during the separation method thereby remaining in the metal-containing feed stream. The metal-containing feed stream may be derived from any metal-containing stream comprising the first metal. For example, the metal-containing feed stream can be derived from a metal mining stream, black sands, a waste stream comprising the first metal, or combinations thereof.

In any embodiment, the first metal and further metal (e.g. a second metal, a third metal, a fourth metal, etc.) may each be independently selected from the group consisting of an alkali metal (e.g., Na, K, Rb), an alkaline earth metal (e.g., Be, Mg, Ca, Sr), a transition metal (e.g., Ti, Zr, V, Nb, Ta, Mo, W, Re, Fe, Ru, Os, Co, Rh, Ir, Ni, Pd, Pt, Cu, Ag, Au, Zn, Hg), a basic metal (e.g., Al, Ga, In), and a semi metal (e.g., Si, Ge, As, Sb). In some embodiments, the first metal may be Pt or Pd.

In any embodiment, a metal-containing feed stream as described herein can be heated via solar energy in a heating zone to a suitable temperature, e.g., a first temperature, to produce a first vapor comprising the first metal. Advantageously, the use of solar energy can result in lower $CO_2$ emission during the metal separation method. Sunlight can provide heat to the heating zone using various solar heating devices as known in the art. For example, mirrors to reflect sunlight onto the heating zone may be used, such as a parabolic mirror. In any embodiment, one or more heliostats having one or more mirrors may be used to reflect sunlight to heat a metal-containing feed stream in a heating zone to a first temperature to produce a first vapor comprising the first metal. In various aspects, the one or more mirrors in the one or more heliostats can be arranged to reflect sunlight to a focal vertex. The heating zone containing the metal-containing feed stream may be disposed in proximity to the focal vertex such that the metal-containing feed stream is heated to a suitable temperature, e.g., a first temperature, to vaporize the first metal. In some embodiments, multiple heliostats may be arranged in array or a tower to reflect sunlight and provide solar energy for heating the metal-containing feed stream. Alternatively, a solar oven may be used to heat a metal-containing feed stream. It is also contemplated herein that the solar energy as described above may be used to supply energy for other steps of the methods described herein. For example, solar energy may be used to condense or cool the first liquid and/or solar energy may be used to solidify the first liquid, and/or solar energy may be used to maintain the metal-containing feed stream in a liquid state.

Additionally or alternatively, energy required for the methods described herein, for example, heating the metal-containing feed stream, cooling the first vapor, solidifying the first liquid, etc., may be supplied by via a wireless power routing system as described in U.S. Pat. No. 10,418,842, which is incorporated herein by reference in its entirety.

In further embodiments, methods are provide herein for separating a low volatility metal from a metal-containing feed stream. For example, the first metal may be a low volatility metal with a lower vapor pressure and high heat of evaporation. The method can include selecting a halide of a volatile material (also referred to as a "volatile material halide"). The volatile material can be any volatile element, preferably a volatile metal. A halide of a volatile metal is also referred to as a "volatile metal halide."

The vapor of the volatile material halide (e.g., volatile metal halide) can be selected to have an average heat of dissociation into volatile material atoms vapor (e.g., volatile metal atoms vapor) and halogen atoms: (i) smaller than the average heat of dissociation of the vapor of a halide of a low volatility metal (also referred to as a "low volatility metal halide") into halogen atoms and low volatile metal atoms; and (ii) greater than the average heat of dissociation of the vapor of the low volatility metal halide into halogen atoms and condensed low volatility metal, as described in U.S. Pat. No. 2,607,675, which is herein incorporated by reference in its entirety. The average heat of dissociation of the vapor of the volatile material halide (e.g., volatile metal halide) into volatile material atoms vapor (e.g., volatile metal atoms vapor) and halogen atoms is the heat of dissociation of volatile material halide (e.g., volatile metal halide) into the vapor of the volatile material atoms (e.g., volatile metal atoms vapor) and the halogen atoms formed by the dissociation divided by the number of those halogen atoms. The volatile material halide (e.g., volatile metal halide) may be a lower halide or a higher halide, preferable a higher halide. The average heat of dissociation of the vapor of the low volatility metal halide into halogen atoms and low volatility metal atoms or condensed low volatility metal, respectively, is the total heat of dissociation of the low volatility metal halide into halogen atoms and low volatility metal atoms or condensed low volatility metal, respectively, divided by the valency of the low volatility metal in the low volatility metal halide.

In some embodiments, the volatile material halide (e.g., volatile metal halide) must not form with the low volatility metal, or with any constituent of the metal-containing feed stream, any non-volatile combination (compound, alloy, solution) (or any stable, though volatile, compounds) which would prevent recovery of the low volatility metal by reversal of the reaction. For instance, if a phosphorus halide is used in the method as a volatile material halide, none of the metals contained in the metal-containing feed stream can form nonvolatile phosphides which are stable under the conditions of reaction. Additionally or alternatively, under the conditions of the reaction and in contact with the metal-containing feed stream, the stable halide of the low volatility metal cannot be converted into an unstable lower halide of the low volatility metal to any noticeable extent.

Thus, the method can include separating a low volatility metal from a metal-containing feed stream by applying solar energy as described above to heat the metal-containing feed stream in the presence of a volatile metal halide in a heating zone to a first temperature as described above to produce a first vapor mixture. In some embodiments, the first temperature can be less than a temperature required to vaporize the low volatility metal (e.g., the boiling point of the low volatility metal) and/or greater than a temperature required to vaporize the volatile metal (e.g., the boiling point of the volatile metal) of the volatile metal halide. The heating of the metal-containing feed stream can be performed at a pressure as described above, for example, at pressure lower than atmospheric pressure. In various aspects, the volatile metal halide can be in vapor form when contacted with the metal-containing feed stream in the heating zone.

As further illustrated below, the following reaction can take place during heating of the metal-containing feed stream in the heating zone:

$$mM^1(c)+nM^2X_m(v) \leftrightarrow nM^1X_n(v)+nM^2(v) \qquad (I)$$

where $M^1(c)$ represents the condensed (e.g., solid or liquid) low volatility metal to be separated, which is assumed to have a valency n, if X represents a halogen and if $M^2X_m(v)$ represents the vapor of the volatile metal halide. $M^1X_n(v)$ and $M^2(v)$ represent the vapor of the low volatility halide and the vapor of the volatile metal or metalloid, respectively. For example, if beryllium is the low volatility metal to be separated and sodium chloride is the volatile metal halide, the reaction is as follows:

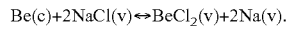

$$Be(c)+2NaCl(v) \leftrightarrow BeCl_2(v)+2Na(v).$$

Thus, the first vapor mixture produced can include: (i) a low volatility metal halide formed from an exchange reaction with the low volatility metal and the volatile metal halide; and (ii) the volatile metal from the volatile metal halide.

In some embodiments, if the low volatility metal to be separated has a valency n and is represented as $M^1(c)$ and if a higher halide ($M^3X_f$) of a metal ($M^3$), which is as volatile as its lower halide ($M^3X_g$) (g<f) the reaction is as follows:

$$(f-g)M^1(c)+nM^3X_f(v) \leftrightarrow (f-g)M^1X_n(v)+nM^3X_g(v) \qquad (II).$$

For example, if aluminum trichloride is the (stable) higher halide and aluminum monochloride is the (unstable) lower halide, the reaction is as follows:

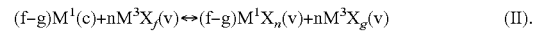

$$2M^1(c)+nAlCl_3(v) \leftrightarrow 2M^1Cl_n(v)+nAlCl(v).$$

Additionally, the method can include converting the first vapor mixture into the low volatility metal and the volatile metal halide. For example, the first vapor mixture may be cooled to a suitable temperature wherein the volatile metal vapor reacts with the low volatility metal halide vapor and forms the low volatility metal ("converted low volatility metal") and the volatile metal halide. The converted low volatility metal can then be condensed or cooled at a suitable temperature to produce a first liquid comprising the low volatility metal. The first liquid may be collected to recover the low volatility metal. Optionally, the first liquid may be solidified via further cooling.

In any embodiment, the low volatility metal can be selected from the group consisting of beryllium, vanadium, rhenium, tantalum, niobium, tungsten, molybdenum, nickel, cobalt, iron, ruthenium, rhodium, palladium, silver, osmium, iridium, platinum, and copper. In some embodiments, the low volatility metal may be platinum or palladium.

The volatile metal halide can be selected from a group consisting of an alkali metal halide, an alkaline earth metal halide, a basic metal halide, arsenic halide, cadmium halide, mercury halide, thallium halide, zinc halide, tin halide, lead halide, and combinations thereof. Thus, the volatile metal can be selected from the group consisting of an alkali metal, an alkaline earth metal, a basic metal, arsenic, cadmium, mercury, thallium, zinc, tin, and lead. In any embodiment, the halide can be selected from the group consisting of a chloride, a fluoride, a bromide, or an iodide, preferably a fluoride or a chloride. In some embodiments, the volatile metal halide can be sodium chloride or aluminum trichloride.

II. Systems for Separating Metals

Systems for separating metals are also provided herein. The system may include a separation unit including a heating zone and a condensation zone, wherein the heating zone is in fluid communication with the condensation zone. The system can further include a means for applying solar energy to heat the heating zone and a metal-containing feed stream as described herein disposed inside the separation unit, particularly, in the heating zone.

Any suitable means for applying solar energy to heat the metal-containing feed stream in the heating zone to a suitable temperature, e.g., a first temperature, to produce a first vapor comprising the first metal may be used. For example, mirrors to reflect sunlight onto the heating zone may be used, such as a parabolic mirror. A solar oven may also be used. Additionally or alternatively, the means for applying solar energy may include one or more mirrors organized into one or more heliostats. The one or more mirrors may be arranged or arrayed to reflect sunlight to a focal vertex, and the heating zone may be disposed near or at the focal vertex. In any embodiment, the focal vertex is disposed at least about 5 meters, at least about 10 meters, at least about 25 meters, at least about 50 meters, at least about 75 meters, or about 100 meters above the top of the tallest mirror.

The term 'about', unless otherwise indicated, when used in conjunction with a numeral refers to a range spanning +/−10%, inclusive, around that numeral. For example, the term 'about 10 μm refers to a range of 9 to 11 μm, inclusive.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context.

The use of any and all examples, or exemplary language (e.g. "such as") provided with respect to certain embodiments herein is intended merely to better illuminate the invention and is not intended to pose a limitation on the embodiments disclosed herein. No language in the specification should be construed as indicating any non-claimed element essential to the practice of the invention.

It should be apparent to those skilled in the art that many more modifications besides those already described are possible. The systems, methods and devices disclosed herein are not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . . and N, the text should be interpreted as requiring only one element from the group, not A plus N, or B plus N, etc.

What is claimed is:

1. A method for separating a low volatility metal from a metal-containing feed stream, the method comprising:

applying solar energy to heat the metal-containing feed stream in the presence of a volatile metal halide in a heating zone to a first temperature to produce a first vapor mixture comprising a low volatility metal halide and a volatile metal, wherein the metal-containing feed stream is derived from black sands;

converting the first vapor mixture into the low volatility metal and the volatile metal halide;

condensing the low volatility metal to produce a first liquid comprising the low volatility metal; and collecting the first liquid.

2. The method of claim 1, wherein the metal-containing feed stream is heated at a pressure below atmospheric pressure.

3. The method of claim 1, wherein the metal-containing feed stream is in a solid or a liquid state.

4. The method of claim 1, further comprising solidifying the first liquid.

5. The method of claim 1, wherein the low volatility metal is selected from the group consisting of beryllium, vanadium, rhenium, tantalum, niobium, tungsten, molybdenum, nickel, cobalt, iron, ruthenium, rhodium, palladium, silver, osmium, iridium, platinum, and copper; and the volatile metal is selected from the group consisting of an alkali metal, an alkaline earth metal, arsenic, cadmium, mercury, thallium, zinc, tin, and lead.

6. The method of claim 1, wherein the halide is selected from the group consisting of a chloride, a fluoride, a bromide, or an iodide.

7. The method of claim 1, wherein the solar energy is applied by focusing one or more mirrors in one or more heliostats.

8. The method of claim 7, wherein the heliostats are arranged in an array or a tower to reflect sunlight and provide solar energy for heating the metal-containing feed stream.

9. The method of claim 7, wherein the one or more mirrors in the one or more heliostats reflect sunlight to a focal vertex and the heating zone is disposed at the focal vertex.

\* \* \* \* \*